Jan. 7, 1930.  N. McCLINTOCK ET AL  1,742,661
FOCUSING DEVICE FOR CAMERAS
Filed Dec. 12, 1927  3 Sheets-Sheet 1
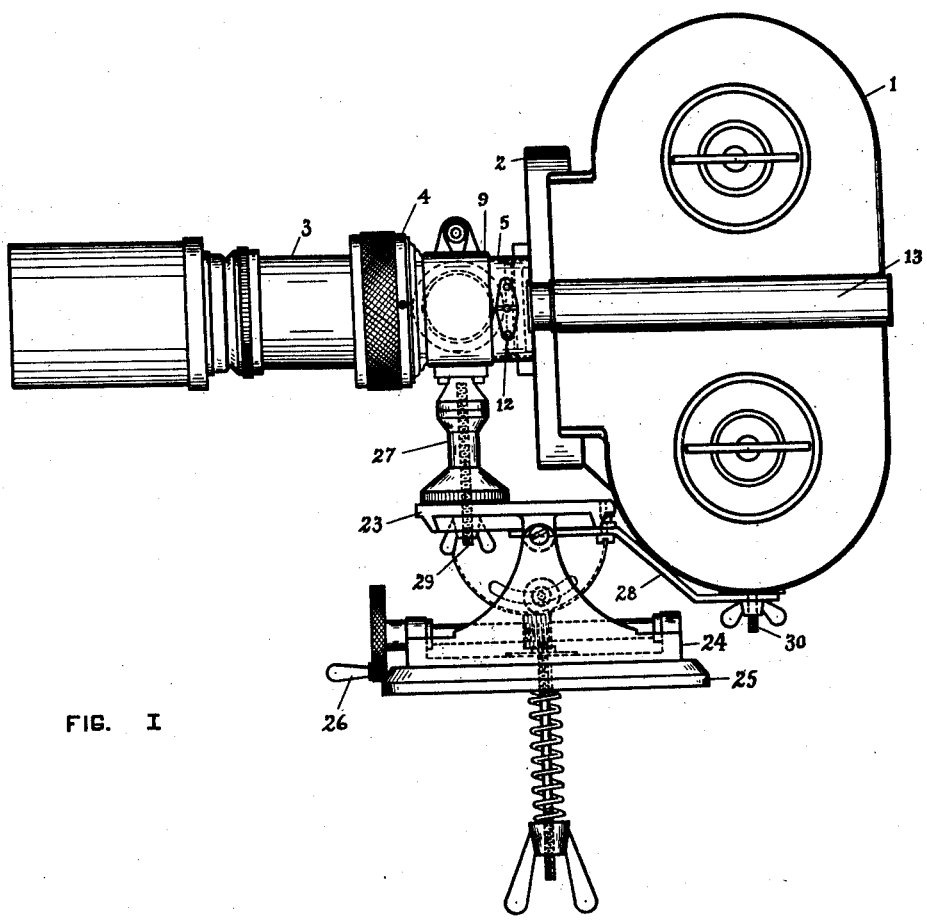
FIG. I
FIG. VII
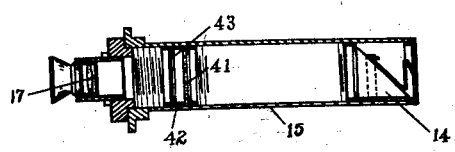

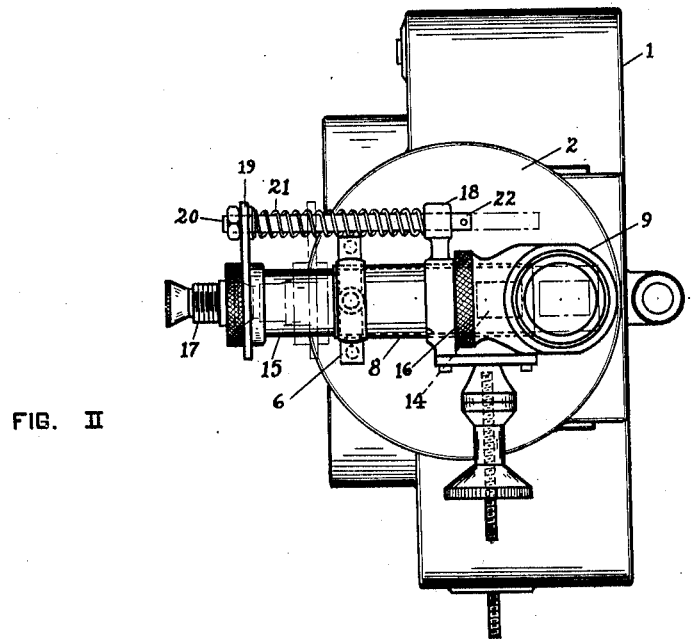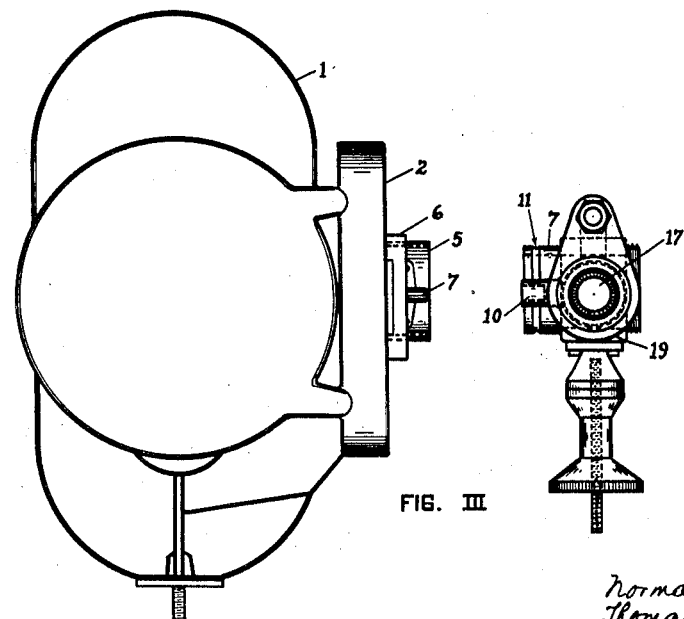

Jan. 7, 1930.  N. McCLINTOCK ET AL  1,742,661
FOCUSING DEVICE FOR CAMERAS
Filed Dec. 12, 1927   3 Sheets-Sheet 3
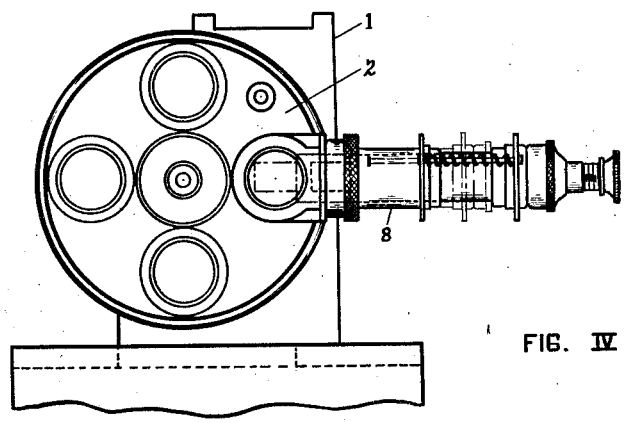
FIG. IV
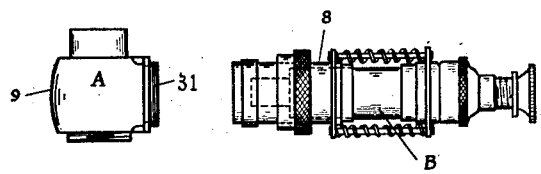
FIG. V
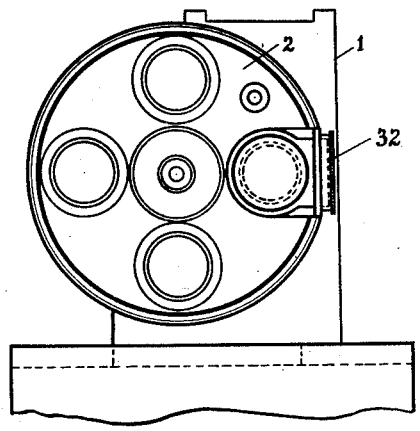
FIG. VI
INVENTORS
Norman McClintock
Thomas McJ. Aiken
by Christy and Christy
their attorneys Patented Jan. 7, 1930

1,742,661

UNITED STATES PATENT OFFICE

NORMAN McCLINTOCK AND THOMAS McG. AIKEN, OF PITTSBURGH, PENNSYLVANIA; SAID AIKEN ASSIGNOR TO SAID McCLINTOCK

FOCUSING DEVICE FOR CAMERAS

Application filed December 12, 1927. Serial No. 239,342.

Our invention relates to improvements in focusing attachments for cameras, and, while the attachment in which our invention is found is applicable to cameras generally and capable of affording benefit and advantage in such general use, we have developed it in application to cameras for taking motion pictures, and in such application we shall show and describe it. Its wider and more general applicability will be evident to those acquainted with such instruments. The objects in view are facility in operation, accuracy of focus, and rigidity of mounting such as to afford a sharper picture.

In the accompanying drawings Fig. I is a view in side elevation of a motion picture camera of known form and structure, having applied to it the attachment in which our invention is found. The camera is shown, mounted upon the table of a tripod of known sort. Fig. II is a view of the same camera in front elevation, having the attachment in position, still applied to it. From the camera as here seen, the lens has, however, for purposes of illustration, been removed; and the camera here is shown separate from the tripod table. Fig. III is a view in side elevation, opposite to that of Fig. I, showing the camera body and the attachment of our invention separated, but in alignment for assembly. Fig. IV is a view in front elevation of a camera of another type, having the attachment of our invention applied to it. Fig. V is a fragmentary view showing in plan from above the two parts detached one from the other, in which our focusing attachment in this instance wholly consists. Fig. VI is a view corresponding to Fig. IV, showing the camera without the focusing attachment, to illustrate the fact that the camera adapted to have the attachment of our invention applied to it, may still when desired be used without that attachment, and in the hitherto usual manner. Fig. VII is a view in medial and longitudinal section of the focusing device of Fig. II detached from its carrier.

The invention centers in a focusing device which includes a mirror and a screen of ground glass or of equivalent material, mounted externally of the camera, and upon the lens barrel. The focusing device is reciprocable in its mounting along a path which is radial with respect to the axis of the lens barrel. In its range of movement the focusing device carries the mirror to and from position in the pathway of light on its way from the lens to the sensitive film within the camera. When the mirror is in position in the pathway it reflects to the screen the light from the lens, and the optical distance from the lens to the screen is exactly equal to that from the lens to the sensitive film within the camera. When the focusing device is in its alternate and inactive position the lens tube is unobstructed, its walls impenetrable by light, and the path of light is free through the lens and to the sensitive film within the camera.

Referring first to the embodiment of the invention shown in Figs. I–III, the camera is an Eyemo, now known to the industry. It is a box 1 adapted to carry on suitable reels the usual strip of senstive film, and it is provided with film-driving apparatus and with a shutter. Externally the camera carries a finder 13 which, given the attachment of our invention, remains of relatively little importance. The whole is so arranged and organized that when the camera is in operation successive areas of an advancing strip of film are for minute intervals of time exposed to the light which enters through the lens, receiving the image of the object upon which the lens is focused.

The front board 2 of the camera is circular and the opening in it, in which the lens is set, is eccentrically placed. The lens is contained in a barrel 3. The milled ring 4 associated with the lens barrel is the focusing ring. By rotation of this ring the focus is changed and determined. The lens structure and the focusing device are known and the general showing of Fig. I will suffice.

In the lens opening in the circular front board 2 we fix a ferrule 5, and upon the front board in a position diametrically opposite to the lens opening we secure a plate 6 with an outstanding stud 7. The ferrule 5 and the stud 7 are cylindrical bodies, projecting from the front board 2, in parallelism one with another. Upon them we mount a bridge member. This bridge member consists of a tubular stem 8 terminating in a tubular cross-arm 9. The tubular stem 8 carries a socket 10. The cross-arm 9 and the socket 10 are axially parallel and are so placed and proportioned that the bridge member may be applied to the front board of the camera, the tubular cross-arm 9 telescoping in the ferrule 5 and the socket 10 receiving the stud 7. The cross-arm 9 is in Fig. III seen to be recessed at 11, and the ferrule 5 is in Fig. I seen to be provided with a spring backed pin 12, and by such provision the bridge when slipped to place may be secured. The tubular cross-arm 9 at its outer end is adapted to receive, and so to constitute a mounting for the lens. It becomes a continuation of the lens barrel.

In the tubular stem 8 of the bridge the focusing device is reciprocable. Preferably the mirror of the focusing device is a prismatic mirror 14, and it is mounted in a carrier, in this case a tube 15, which slides within the tubular stem 8. The mirror in the range of reciprocation alternately takes its active position, intercepting the light as it advances from the lens toward the camera, and its inactive position, leaving unobstructed the pathway for the advance of light. And when the mirror is in inactive position the tubular stem 8 is closed against entrance of light to the lens barrel. In Fig. II the tube 15 which carries the mirror 14 is shown in full lines and the mirror itself in dotted lines. This is the inactive position. The alternative active position is indicated in broken lines. When the mirror is in active position it reflects light from the lens and casts upon a suitably placed screen the image of the object upon which the lens is to be focused; and, as has been said, the optical distance from lens to screen is precisely that from lens to film. The screen being visible, focusing manifestly may be performed with accuracy and expedition. The screen is carried by and is arranged transversely within the tube 15, and at proper and accurately determined interval from the mirror. The screen and the mirror may be and preferably will be adjustable in their mounting in tube 15 and one to another, and, while either or both of these members may be made so adjustable, it will be found convenient to mount the screen for minute adjustment within the tube. It is, however, a characteristic feature of the focusing device of the invention that, when the mirror and the screen have been adjusted in their positions one to another, that accurately established space relation is maintained while the focusing device as a whole continues shiftable between active and inactive positions. Referring to Fig. VII the positions of the mirror 14 and of the screen 41 within the tube 15 are shown. These two parts are adjustable one to another in their positions within the tube; and preferably it is the screen 41 which is movable, while mirror 14 remains fixed in its position. In this instance the bore of tube 15 is threaded and the screen is carried on a ring 42 correspondingly threaded, and thus minute adjustment may be effected. A mask 43 also may be provided, to define the field of the sensitized film. At its outer end the tube 15 may be equipped with a magnifying glass 17, to enlarge the image on the screen and thus to facilitate focusing.

Provision is made that the focusing device shall normally rest in inactive position, the stem 8 closes to ingress of light through it to the lens barrel; that, when the focusing device is to be used it may be shifted readily, instantly, and accurately to active position and retained there so long as may be desired; and that when focusing has been effected, the focusing device may again readily, instantly, and accurately return to inactive position, leaving the lens in focus and ready for the immediate picture-taking. To that end the tube 15 slides easily within stem 8, its range of sliding is at both ends limited by positive stops, and a spring is provided for retaining it normally at the outer end of its range. The tension of the spring, sufficient to meet requirements, is light, and the device may with slight pressure of the operator's hand be shifted to and retained in active position. The stem 8 carries an arm 18 with an eye through it; the tube 15 carries an arm 19 with an eye through it. A bolt 20 extends through the aligned eyes. A spring 21 and a stop block 22 hold the tube yieldingly and accurately in its inactive position, and when the tube is forced inward against spring tension, abutment of the inner end of tube 15 upon the inner wall of cross-arm 9 determines with accuracy the active position.

Our invention makes possible the focusing of this camera with speed and accuracy, and enables the operator to expose the film, beginning the very instant after proper focus has been got. Focusing is done through the picture-taking lens. Incidentally, the focusing device renders a finder unnecessary, at least during the time immediately preceding the instant when exposure begins. In operation the parts are assembled in the position shown in Fig. I (cf. Fig. II). When the camera has been set up and is to be minutely positioned and focused, the operator pressing the tube 15 inward brings the focusing device to operative position. He then sees through magnifying glass 17 and upon the screen within tube 15 his picture. By turning ring 4 he brings the lens to focus and by manipulation of parts presently to be described he makes any desired change in the position of the camera upon its support, in order to adjust the field to the object to be photographed.

When he releases the focusing device, it automatically returns to inactive position, and at once he may proceed with exposure.

Our invention further involves and renders possible such a supporting structure for the camera as, interfering in no respect with position-adjusting mechanism, affords a rigidity hitherto unattained and enlarges the field of use.

A tripod of known form includes a table 23 adapted to swing on a horizontal axis in its mounting upon a plate 24, which plate is rotatable on a vertical axis in its mounting upon the tripod head 25. The legs of the tripod are not shown. Rotation of plate 24 upon the tripod head is effected by the operator by manual pressure, and he thus swings the camera in horizontal direction. Rotation of table 23 upon its horizontal axis is effected by turning a crank 26. The turning of crank 26 effects, through the worm drive sufficiently indicated in Fig. I, the swinging of the camera in vertical direction.

Hitherto the mode of mounting this camera upon a tripod has been by securing it at a single point of support to the table 23. A camera so supported is insecure to such extent that the cranking incident to picture-taking sets up vibration. The vibration is slight, and for picture-taking at long range may be negligible, but it is still sufficiently great, that short-range picture-taking is impossible, and telephoto work is impossible. There is a liability to blurring. And in telephoto work the vibration is increased, because a large and heavy lens is required, and when the camera is equipped with such a lens the center of gravity is carried farther from the point of support.

To the bridge which we have described, whose central member is the hollow stem 8, we add a pedestal 27, and to the table 23 of the tripod we add an extension 28, and we proportion these parts as shown in Fig. I. The camera is primarily supported on pedestal 27 and secured by a bolt 29. It is steadied in its position by a second support, being secured by bolt 30 to extension 28. The shifting of the primary support from a point beneath box 1 (say at 30) to a point beneath the base of the lens barrel (at 29) is a shifting toward the center of gravity, where the weight of the camera box and its contents and the weight of the lens are more or less completely in counterbalance; and the further provision of a second point of anchorage (30), at a very appreciable distance remote from the point of primary support, result in such rigidity that the jar of cranking the camera has no appreciable disturbing effect, and pictures at close range, telephoto pictures, and miscoscopic pictures may be taken with clearness of definition.

In Figs. IV-VI we show the invention in generic aspect applied to a motion-picture camera of another standard type, known as the Bell & Howell professional camera. In this case the lens board 2 is rotatable upon the camera box 1, to bring one or another of a plurality of lenses (in this instance there is provision for four) to position for service. It is usual in this camera that two or three of the lenses are mounted permanently in their orifices in the front board (called the turrret) and that one of the openings is left as a spare opening, to receive whatever lens the user may desire. We mount in this spare opening a lens (ordinarily of greater focal length) for our particular use, and this lens of greater focal length we equip with the focusing device of our invention.

The embodiment of our invention in this instance also includes a tubular stem 8 terminating in a tubular cross-arm 9. In Fig. V these two parts are shown separated but in alignment, and as indicated they are united in screw-threaded engagement. The tubular stem 8 carries the reciprocable mirror, with which are associated a screen (not shown) and a magnifying glass, as in the embodiment first described. The only difference is that in this case the focusing device is mounted upon and carried solely by the cross-arm 9. The cross-arm 9 as before is adapted to be seated at one end in an orifice in the front board 2 of the camera and at the other to be engaged by and to support a lens. Thus it becomes part of the lens barrel. The operation of the focusing device is identically that described in connection with the structure of Figs. I-III.

Comparing Figs. V and VI, it will be seen that the cross-arm 9 may receive upon its screw-threaded orifice 31 either the tubular stem 8 of the focusing device or a closure cap 32. Thus the cross-arm 9 of the focusing device may constitute the base member of the lens barrel and the focusing device in which my invention centers may be applied and brought into use or taken away, leaving the camera entirely serviceable without it, as may be desired.

We claim as our invention:

1. In a photographic camera the combination of a camera box, a lens barrel, a lens borne by the lens barrel and adjustable in its position relative to the camera box, a guideway secured to the lens barrel at a point intermediate between the lens and the camera box, and a focusing device including a mirror and a screen reciprocable as a unit upon the guideway in a direction radial with respect to the axis of the lens barrel, and means tending to hold the focusing device yieldingly at one end of its range of reciprocation.

2. In a photographic camera the combination of a camera box, a lens barrel, a lens borne by the lens barrel and adjustable in its position relative to the camera box, and a focusing device including a tubular stem extending radially from the lens barrel at a point intermediate between the lens and the camera box, a carrier borne by and reciprocable in such tubular stem, and a mirror and a screen mounted on said carrier and adjustable in their relative positions in said carrier.

3. In a photographic camera the combination of a camera box, a lens barrel, a lens borne by the lens barrel and adjustable in its position relative to the camera box, a guideway secured to the lens barrel, a carrier reciprocable upon said guideway in a direction radial with respect to the axis of the lens barrel, a mirror mounted on said carrier and a screen mounted on said carrier and adjustable in such mounting.

4. In a photographic camera the combination of an orificed camera box, a tubular member borne in the orifice in the camera box, a focusable lens coaxially borne by said tubular member, a guideway extending radially from said tubular member, and a tube carrying a mirror and a screen reciprocable on said guideway, the said guideway being provided with means for securing it to a support.

5. In a photographic camera the combination of an orificed camera box, a tubular member adapted to be mounted in the orifice in the camera box and to carry coaxially a focusable lens, a bridge of which said tubular member constitutes one foot and provided with a second foot adapted to engage the camera box externally, a focusing device including a carrier equipped with a mirror reciprocable upon said bridge and to and from position within said tubular member.

6. The structure of claim 5, together with a camera support adapted to engage said bridge.

7. The structure of claim 5, together with a camera support adapted to engage simultaneously said bridge and also said camera box at a point remote from said bridge.

In testimony whereof we have hereunto set our hands.

NORMAN McCLINTOCK.
THOMAS McG. AIKEN.